(12) United States Patent
Vasudevan

(10) Patent No.: US 7,579,080 B2
(45) Date of Patent: Aug. 25, 2009

(54) MODIFIED PIGMENT-BASED INKS AND METHOD OF MAKING MODIFIED PIGMENT-BASED INKS

(75) Inventor: Sundar Vasudevan, Corvallis, OR (US)

(73) Assignee: Hewlett-Packard Development Compan, L.P., Houston, TX (US)

( * ) Notice: Subject to any disclaimer, the term of this patent is extended or adjusted under 35 U.S.C. 154(b) by 360 days.

(21) Appl. No.: 11/350,970

(22) Filed: Feb. 9, 2006

(65) Prior Publication Data

US 2007/0181037 A1    Aug. 9, 2007

(51) Int. Cl.
*B32B 5/66*    (2006.01)
(52) U.S. Cl. .................. 428/403; 428/404; 428/405; 428/406; 428/407; 427/212; 427/213.31
(58) Field of Classification Search ......... 428/403–407; 427/212, 213.31
See application file for complete search history.

(56) References Cited

U.S. PATENT DOCUMENTS

| 3,532,662 A | 10/1970 | Ansdell |
| 6,395,805 B1 | 5/2002 | Takao |
| 6,723,783 B2 * | 4/2004 | Palumbo et al. ............. 524/555 |
| 2005/0066856 A1 | 3/2005 | Lee |

FOREIGN PATENT DOCUMENTS

| EP | 1 061 106 A | 12/2000 |
| GB | 1 348 164 A | 3/1974 |
| GB | 2 373 789 A | 10/2002 |

* cited by examiner

*Primary Examiner*—Leszek Kiliman

(57) ABSTRACT

Briefly described, embodiments of this disclosure include chemicals, modified pigments, and methods of preparing a modified pigment.

9 Claims, 5 Drawing Sheets

MODIFIED PIGMENT-BASED INKS AND METHOD OF MAKING MODIFIED PIGMENT-BASED INKS

BACKGROUND

The use of inkjet printing systems in offices and homes has grown dramatically in recent years. The growth can be attributed to drastic reductions in cost of inkjet printers and substantial improvements in print resolution and overall print quality. While the print quality has drastically improved, research and development efforts continue toward improving the permanence of inkjet images because this property still falls short of the permanence produced by other printing and photographic techniques. A continued demand in inkjet printing has resulted in the need to produce images of high quality, high permanence, and high durability, while maintaining a reasonable cost.

One area of particular interest concerns modifying the surface of pigments. The surface of pigments contain a variety of different functional groups, and the types of groups present depend on the specific class of pigment. Several methods have been developed for grafting materials to the surface of these pigments. For example, it has been shown that polymers can be attached to carbon blacks containing surface groups such as phenols and carboxyl groups. However, methods that rely on the inherent functionality of a pigment's surface cannot be applied generally because not all pigments have the same specific functional groups.

Methods for the preparation of modified pigment products have also been developed which can provide a pigment with a variety of different attached functional groups. For example, methods have been disclosed for the attachment of organic groups onto pigments including, for example, attachment via a diazonium reaction wherein the organic group is part of the diazonium salt.

While these methods provide modified pigments having attached groups, there remains a need for improved processes for attaching groups to a pigment. These additional methods may provide advantageous alternatives to forming modified pigments.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Modified pigments, modified pigment intermediates, pre-pigment intermediates, formulations incorporating modified pigments, and methods of making modified pigments, modified pigment intermediates, and pre-pigment intermediates, are described. In general, embodiments of the present disclosure provide methods to produce modified pigment intermediates having about two or three times the number of available sites than current technologies to attach compounds of interest (e.g., polymers) per compound (e.g., pre-pigment intermediate prior to attachment) attached to the pigment. In particular, embodiments of the present disclosure provide methods to produce pre-pigment intermediates (e.g., chemical compounds that are not attached to a pigment) having two to six reactive groups (e.g., $CO_2R$, $NH_2$, and NH) per pre-pigment intermediate compound, which is two to three times as many as current technologies. In embodiments having two or more carbonyl groups, each pair of carbonyl groups can form a six membered ring with a metal ion on the media. Furthermore, embodiments of the methods can be used to prepare anionic pigment dispersions and cationic pigment dispersions using the same starting synthon as shown in FIG. 1, structure Q2.

Figure 1:
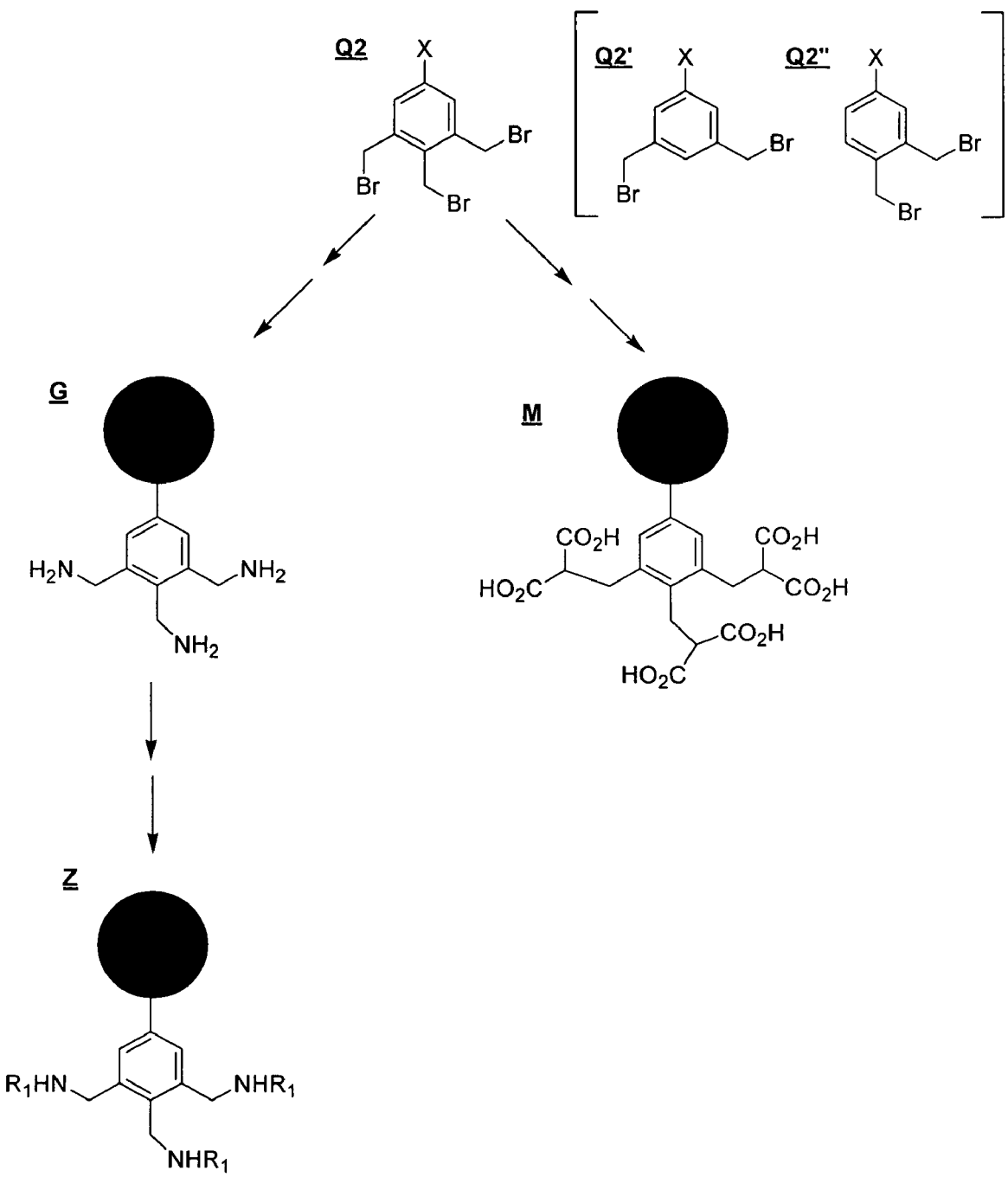
FIG. 1 illustrates an embodiment of a representative reaction sequence to produce modified pigment intermediates and modified pigments.

In general, FIG. 1 illustrates an embodiment of a representative reaction sequence to produce modified pigment intermediates G and M (structures G and M) and modified pigment Z (structure Z) from pre-pigment intermediate Q2 (structure Q2). It should be noted that structures similar to Q2 can also be used that only have two function groups (e.g., two $CH_2Br$ groups as opposed to three, where any one of the groups can be excluded, structures Q2' and Q2").

In FIG. 1, structure M is stabilized in dispersion because of the presence of the carboxyl groups. The carboxyl groups would be mostly ionized above their pKa and the resultant negative charges from the carboxylate anions would provide stability for the dispersion. Likewise, in structure G, the amine groups would be protonated as the ammonium salts below their pKa. The positive charges from the ammonium cations would provide stability for the dispersion at acidic pH values below their pKa. Cationic or anionic dispersions represented by structure Z may also be prepared from structure G by attaching a polymer R1 of suitable structure and reactive group to the amine groups on structure G. It should also be noted that structures G and M are themselves pigment dispersions. They can also be reacted further with suitable polymers with appropriate reactive groups. For example, structure G may be reacted with a polymer containing carboxyl groups such as a copolymer of acrylic or methacrylic acid resulting in an anionically stabilized pigment dispersion. Likewise, structure M may be reacted with a polyethyleneimine resulting in a cationically stabilized dispersion.

Structure Q2 is a 1,2,3-tribromomethyl benzene having an X group such as H or $NO_2$. Selection of X depends on the reaction pathway used, such as those described in FIGS. 2 and 3 (structure Q1 (1,2,3-trisbromomethyl benzene) and structure Q2 (3,4,5-trisbromomethyl-1-nitrobenzene)). Modified pigment intermediates H and M can be produced through reaction pathways such as those described in FIGS. 2 through 5.

Modified pigment Z can be produced by reaction of the nucleophilic amine group of structure G with an electrophilic group such as a carboxyl group, a sulfonly group, an epoxy group, a halogen atom, and the like. Amine reactive functional groups are well known in the art. R1 can include one or any combination of compounds such as, but not limited to, polymers and small molecules. The polymers can include one or any combination of polymers, co-polymers, block polymers, random polymers, and homopolymers such as, but not limited to, styrene-maleic anhydride polymer, polyethylene glycol, polypropylene glycol, styrene-acrylate co-polymer, polyacrylic acid, polymethacrylic acid, copolymers of acrylic or methacrylic acid with suitable comonomers such as styrene, a-methyl styrene, alkyl acrylate, alkyl methacrylate, glycidyl acrylate or methacrylate, vinyl sulfonic acid, or styrene sulfonic acid. The small molecule can include, but is not limited to, S-ethylthiopsuedourea, amino acid (e.g., arginine, lysine, aspartic acid, glutamic acid), and oligopeptides containing up to six amino acids.

In addition, other chemicals known in the art can be attached to the pigments to achieve certain other pigment characteristics such as, but not limited to, resistance to acids, resistance to bases, miscibility with various solvents, improved light fastness, improved colloidal stability, and combinations thereof.

The precursor compound of the modified pigment can be attached to the pigment through a reaction involving diazonium cation chemistry, and the pigment is covalently bonded to the pigment. Diazonium chemistry is discussed in U.S. Patents Nos. 6,723,783; 5,554,739; 5,922,118; 5,900,029; 5,895,522; 5,885,335; 5,851,280; 5,837,045; and 5,707,432, and U.S. patent applications 20030205171 and International patent application WO 01/51566, each of which are incorporated herein by reference.

The pigment can include, but is not limited to, black pigment-based inks and colored pigment-based inks. Colored pigment-based inks can include, but are not limited to, blue, brown, cyan, green, white, violet, magenta, red, orange, yellow, as well as mixtures thereof.

The following black pigments can be used in the practice of this disclosure; however, this listing is merely illustrative and not intended to limit the disclosure. The following black pigments are available from Cabot: Monarch™ 1400, Monarch™ 1300, Monarch™ 1100, Monarch™ 1000, Monarch™ 900, Monarch™ 880, Monarch™ 800, and Monarch™ 700, Cab-O-Jet™ 200, Cab-O-Jet™ 300, Black Pearls™ 2000, Black Pearls™ 1400, Black Pearls™ 1300, Black Pearls™ 1100, Black Pearls™ 1000, Black Pearls™ 900, Black Pearls™ 880, Black Pearls™ 800, Black Pearls™ 700; the following are available from Columbian: Raven 7000, Raven 5750, Raven 5250, Raven 5000, and Raven 3500; the following are available from Degussa: Color Black FW 200, Color Black FW 2, Color Black FW 2V, Color Black FW 1, Color Black FW 18, Color Black S 160, Color Black FW S 170, Special Black 6, Special Black 5, Special Black 4A, Special Black 4, Printex U, Printex 140U, Printex V, and Printex 140V Tipure™; and R-101 is available from DuPont.

The pigment may also be chosen from a wide range of conventional colored pigments. For the purposes of clarification only, and not for limitation, some exemplary colorants suitable for this purpose are set forth below. The color of the second ink formulation can include, but is not limited to, blue, black, brown, cyan, green, white, violet, magenta, red, orange, yellow, as well as mixtures thereof.

Suitable classes of colored pigments include, for example, anthraquinones, phthalocyanine blues, phthalocyanine greens, diazos, monoazos, pyranthrones, perylenes, heterocyclic yellows, quinacridones, bisindolidiones and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128, and Pigment Yellow 138.

Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

Other examples of pigments include Hostafine series such as Hostafine™ Yellow GR (Pigment 13), Hostafine™ Yellow (Pigment 83), Hostafine™ Red FRLL (Pigment Red 9), Hostafine™ Rubine F6B (Pigment 184), Hostafine™ Blue 2G (Pigment Blue 15:3), Hostafine™ Black T (Pigment Black 7), and Hostafine™ Black TS (Pigment Black 7), available from Hoechst Celanese Corporation, Normandy Magenta RD-2400 (Paul Uhlich), Paliogen Violet 5100 (BASF), Paliogen™ Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen™ Blue L6900, L7020 (BASF), Heliogen™ Blue D6840, D7080 (BASF), Sudan Blue OS (BASF), PV Fast Blue B2GO1 (American Hoechst), Irgalite Blue BCA (Ciba-Geigy), Paliogen™ Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen™ Orange 3040 (BASF), Ortho Orange OR 2673 (Paul Uhlich), Paliogen™ Yellow 152, 1560 (BASF), Lithol Fast Yellow 0991K (BASF), Paliotol Yellow 1840 (BASF), Novoperm™ Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm™ Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen ™ Red 3871K (BASF), Paliogen ™ Red 3340 (BASF), and Lithol Fast Scarlet L4300 (BASF).

Figure 2:
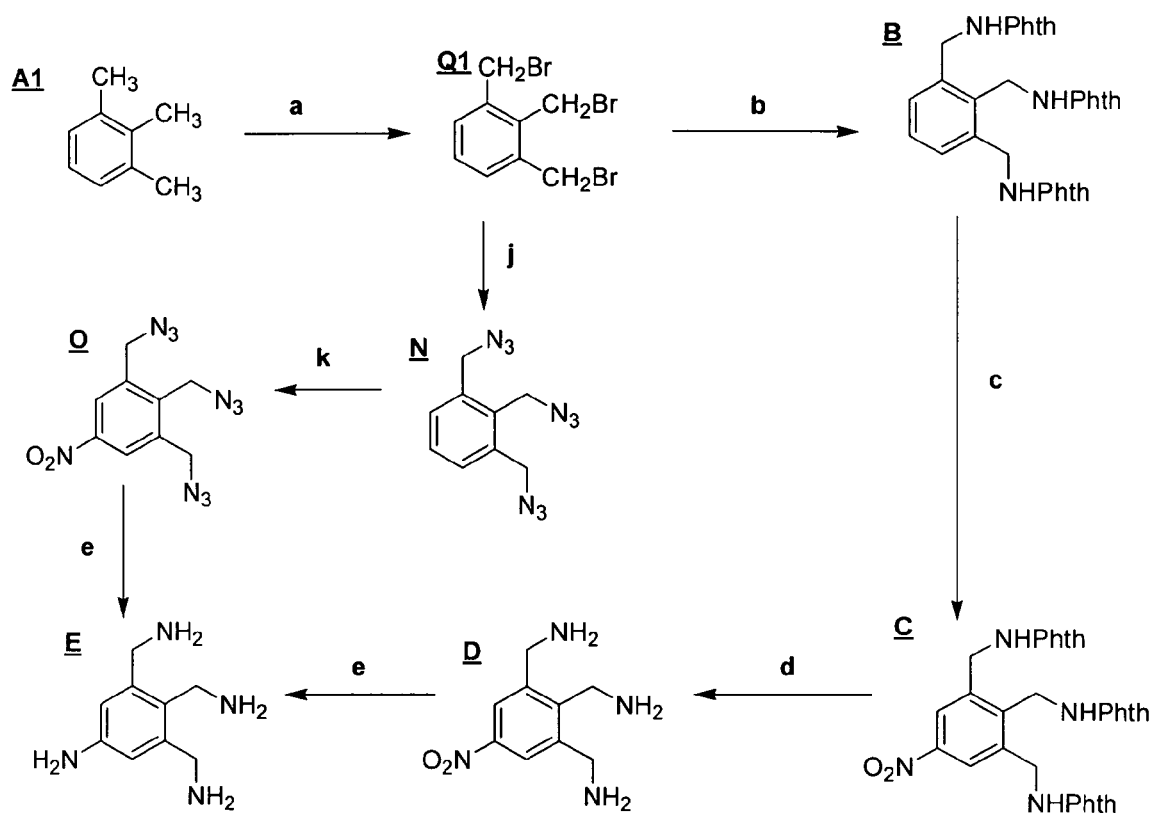
FIG. 2 illustrates an embodiment of a representative reaction sequence to produce intermediates to the modified pigment intermediates and modified pigments.

FIG. 2 illustrates an embodiment of a representative reaction sequence to produce a number of pre-pigment intermediates to the modified pigment intermediates and modified pigments. Initially, commercially available structure A1 is provided and, according to reaction a, reacted with about 3.0 to 3.3 mole equivalents of N-bromosuccinimide (NBS) and a catalytic amount (about 0.1 to 0.11 mole equivalent) of azobisisobutyronitrile (AIBN) or benzoyl peroxide in carbon tetrachloride (CCl$_4$) for 18 hours at reflux temperature to form structure Q1. Other reagents that can be used to accomplish this transformation include bromine water, pyridinium tribromide, bromotrichloromethane, carbon tetrabromide, and others. (See page 616 of "Comprehensive Organic Transformations," by Richard C. Larock, Wiley-VCH Publishers, Second edition, 1999, which is incorporated herein by reference).

Structure Q1 is reacted according to reaction b with about 3.0 to 3.3 mole equivalents of potassium phthalimide in DMF under heating for several hours to produce structure B.

Structure B is reacted according to reaction c with about 1.0 to 1.1 mole equivalent of potassium nitrate and commercially available concentrated sulfuric acid to produce structure C (see Olah, G. A.; Malhotra, R.; Narang, S. C. "Nitration: Methods and Mechanisms," VCH, NY, 1989, which is incorporated herein by reference in its entirety).

Structure C is reacted according to reaction d with about 3.0 to 3.3 mole equivalents of hydrazine hydrate in methanol and heated to reflux to produce structure D. (see Sheehan, J. C.; Bolhoper, W. A. J. Am. Chem. Soc. 1950, Vol. 72, 2786-2788, which is incorporated herein by reference in its entirety). Acid or alkaline hydrolysis, for example, would also work to effect this change but hydrazine is the preferred reagent.

Structure D is reacted according to reaction e in methanol with hydrogen gas at about 15 psig and about 10 percent by weight palladium on charcoal (about 0.09 g to 0.11 g for 1.0 g of D) at room temperature for several hours to produce structure E. Catalytic hydrogenation is the preferred method of reducing an aromatic nitro compound to an amino compound. Other catalysts may be used. For other catalysts and other methods of reduction see page 823-827 of "Comprehensive Organic Transformations," by Richard C. Larock, Wiley-VCH Publishers, Second edition, 1999, which is incorporated herein by reference.

Alternatively, structure Q1 may also be reacted according to reaction j with three about 3.0 to 3.3 mole equivalents mole equivalents of sodium azide in acetone at reflux temperature for 8 hours to produce structure N.

Structure N can be nitrated according to reaction k with potassium nitrate and sulfuric acid analogous to structure B to produce structure O.

Catalytic reduction of structure O according to reaction e with about 10 percent by weight palladium on charcoal (about 0.09 g to 0.11 g for 1 g of O) as catalyst and at about 15 psig pressure of hydrogen gas at room temperature for 6 hours would result in reduction of the nitro group as well as the azido groups to produce structure E.

Figure 3:
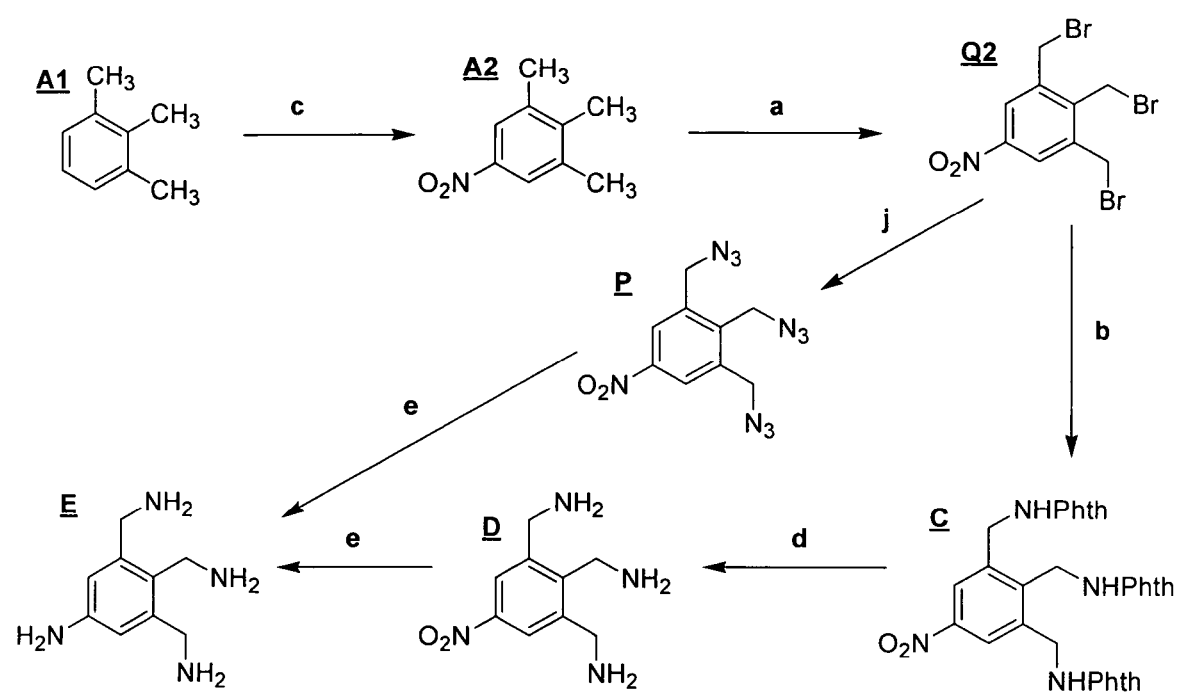
FIG. 3 illustrates another embodiment of a representative reaction sequence to produce intermediates to the modified pigment intermediates and pigment intermediates.

FIG. 3 illustrates another embodiment of a representative reaction sequence to produce a number of pre-pigment intermediates to the modified pigment intermediates and pigment intermediates. Initially, structure A1 is provided and, according to reaction c, reacted with about 0.95 to 0.11 mole equivalent of potassium nitrate and commercially available concentrated sulfuric acid to produce structure A2 (see Olah, G. A.; Malhotra, R.; Narang, S. C. "Nitration: Methods and Mechanisms," VCH, NY, 1989).

Structure A2 is reacted according to reaction a with about 3.0 to 3.3 mole equivalents of N-bromosuccinimide (NBS) to produce structure Q2 (see page 616 of "Comprehensive Organic Transformations," by Richard C. Larock, Wiley-VCH Publishers, Second edition, 1999).

Structure Q2 is reacted according to reaction b with about 3.0 to 3.3 mole equivalents of potassium phthalimide in DMF under heating for several hours to produce structure C.

Structure C is reacted according to reaction d with about 3.0 to 3.3 mole equivalents of hydrazine hydrate in methanol and heated to reflux to produce structure D (see Sheehan, J. C.; Bolhoper, W. A. J. Am. Chem. Soc. 1950, Vol. 72, 2786-2788).

Structure D is reacted according to reaction e with about 15 psig pressure of hydrogen gas and about 10% by weight of palladium on charcoal (about 0.09 g to 0.11 g for 1 g of D) to produce structure E (see page 823-827 of "Comprehensive Organic Transformations," by Richard C. Larock, Wiley-VCH Publishers, Second edition, 1999).

In an alternative reaction path way; structure Q2 is treated with about 3.0 to 3.3 mole equivalents of sodium azide in acetone at reflux temperature for 8 hours to produce structure P.

Catalytic reduction of structure P, as shown in reaction e, with about 10% by weight of palladium on charcoal as catalyst (about 0.09 g to 0.11 g for 1 g of P) and at 15 psig pressure of hydrogen gas at room temperature for 6 hours would result in reduction of the nitro group as well as the azido groups to produce structure E.

Figure 4:
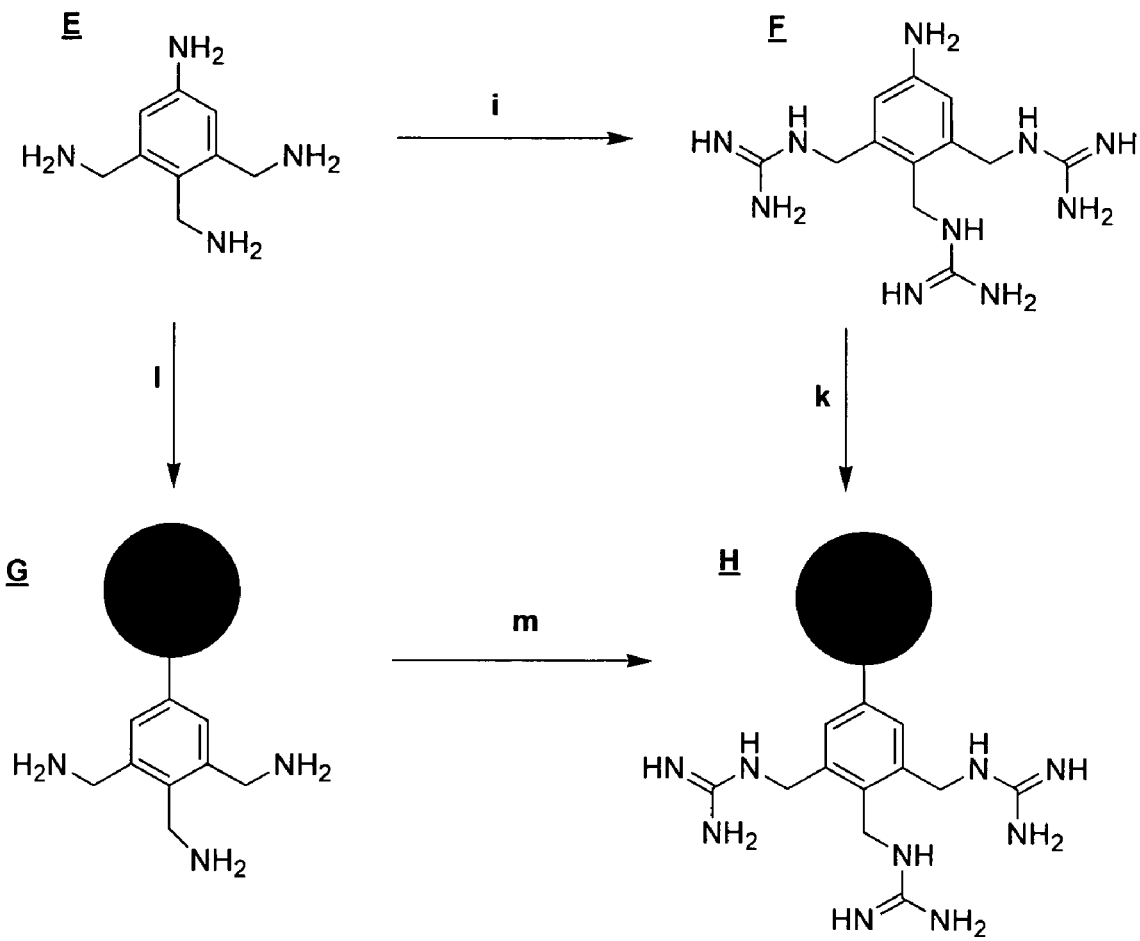
FIG. 4 illustrates embodiments of representative reaction sequences to produce modified pigment intermediates and modified pigments.

FIG. 4 illustrates embodiments of representative reaction sequences to produce modified pigment intermediates and modified pigments. In a first embodiment, structure E (a pre-pigment intermediate) is provided. For example, structure E can be prepared in a manner as described in FIGS. 2 and 3 and the corresponding text. Structure E is reacted according to reaction i with about 3.0 to 3.3 mole equivalents of s-ethylthiopseudourea hydrobromide to produce structure F (a pre-pigment intermediate).

Structure F is reacted according to reaction k with sodium nitrite and dilute (about 0.1M to 2.0M hydrochloric or nitric acid and added to pigment suspended in water as per US20030205171 (assigned to Cabot, which is incorporated herein by reference) to produce structure H (a modified pigment), where ●, the large black circle, represents a pigment as described above.

In addition, structure H can be formed through an alternative route as described below. In a first embodiment, structure E is provided. For example, structure E can be prepared in a manner as described in FIGS. 2 and 3 and the corresponding text. Structure E, according to reaction l, is reacted with a pigment suspended in water in the presence of sodium nitrite and dilute (about 0.1M to 2.0M) acid to produce structure G (a modified pigment intermediate), where ● is a pigment as described above. For example, structure G can be attached to the pigment through a reaction involving diazonium cation chemistry as described above.

Structure G is reacted according to reaction m with S-ethylthiopsuedourea hydrobromide to produce structure H.

Figure 5:
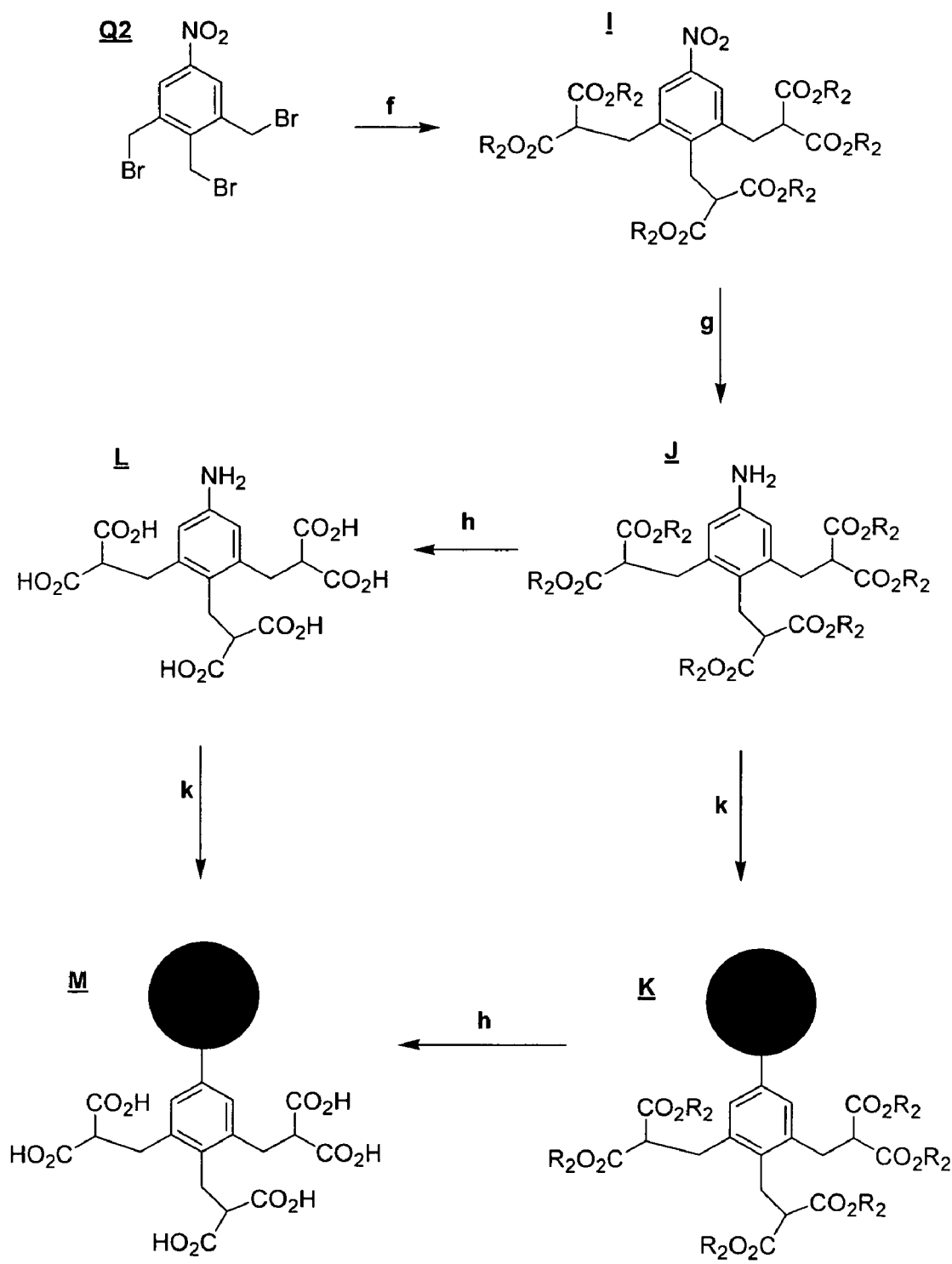
FIG. 5 illustrates embodiments of representative reaction sequences to produce modified pigment intermediates and modified pigments.

FIG. 5 illustrates embodiments of representative reaction sequences to produce modified pigment intermediates and modified pigments. In a first embodiment, structure Q2 (a pre-pigment intermediate) is provided. For example, Q2 can be prepared in a manner as described in FIG. 3 and the corresponding text. Structure Q2 is reacted according to reaction f with about 3.0 to 3.3 mole equivalents of dialkyl malonate and the same number of mole equivalents of potassium t-butoxide, and DMSO to produce structure I (a pre-pigment intermediate). R2 can be an alkyl group such as, but not limited to, methyl, ethyl, and combinations thereof.

Structure I is reacted according to reaction g in methanol with about 15 psig of H$_2$ and catalytic amount (about 0.09 g to 0.11 g per g of I) of about 10% Pd/C at room temperature for 8 hours to produce structure J (a pre-pigment intermediate).

Structure J is reacted according to reaction k with a pigment suspended in water in the presence of sodium nitrite and dilute (about 0.1M to 2.0M) acid as per US20030205171 (assigned to Cabot) produce structure K (a modified pigment intermediate), where ● is a pigment as described above. Thus, structure J can be attached to the pigment through a reaction involving diazonium cation chemistry as described above.

Structure K is reacted according to reaction h with potassium carbonate or potassium hydroxide in methanol at room temperature for 14 hours to produce structure M (a modified pigment).

In addition, structure M can be formed through an alternative route as described below. Initially, structure Q2 is provide, for example, Q2 can be prepared in a manner as described in FIG. 3 and the corresponding text. Structure Q2 is reacted with about 3.0 to 3.3 mole equivalents of dialkyl malonate and the same number of mole equivalents of potassium t-butoxide, and DMSO to produce structure I, as noted above. R2 can be an alkyl group such as, but not limited to, methyl, ethyl, and combinations thereof.

Structure I is reacted in methanol with $H_2$ at about 15 psig pressure and catalytic amount (about 0.09 g to 0.11 g per g of I) of about 10% Pd/C at room temperature for 8 hours to produce structure J, as noted above.

Structure J is reacted according to reaction h with KOH or potassium carbonate in methanol or ethanol at room temperature for 14 hours to produce structure L (a pre-pigment intermediate).

Structure L is reacted according to reaction k with a pigment suspended in water in the presence of sodium nitrite and dilute (about 0.1M to 2.0M) acid as per US20030205171 (to Cabot, which is incorporated herein by reference) to produce structure M, where ● is a pigment as described above. Thus, structure L can be attached to the pigment through a reaction involving diazonium cation chemistry as described above.

Embodiments of the present disclosure will employ, unless otherwise indicated, techniques of synthetic organic chemistry, ink chemistry, and the like, which are within the skill of the art. Such techniques are explained fully in the literature.

The previous examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Pressures where described for reaction conditions are pounds per square inch gauge (psig) pressure meaning that much pressure above ambient pressure. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

Many variations and modifications may be made to the above-described embodiments. All such modifications and variations are intended to be included herein within the scope of this disclosure and protected by the following claims.

What is claimed is:

1. A modified pigment having a structure

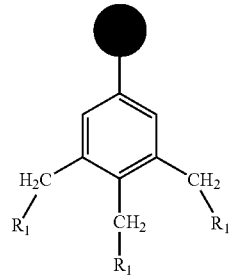

wherein $R_1$ is selected from a group consisting of $NHR_2$ and

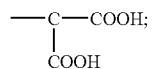

and wherein $R_2$ is selected from the group consisting of a hydrogen atom, a polymer, S-ethylthiopsuedourea, an amino acid, an oligopeptide and

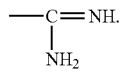

2. The modified pigment according to claim 1, wherein $R_1$ is $NHR_2$ and $R_2$ is

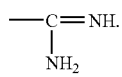

3. The modified pigment according to claim 1, wherein $R_1$ is

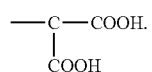

4. The modified pigment according to claim 1, wherein $R_1$ is selected from the group consisting of $NHR_2$, where $R_2$ is selected from copolymer of acrylic acid or methacrylic acid with a monomer selected from the group consisting of styrene, .alpha.-methylstyrene, alkyl acrylate, alkyl methacrylate, alkyl vinyl ether, polyethylene oxide (PEO), polypropylene oxide (PPO), polyethyleneimine (PEI) and combinations thereof.

5. The modified pigment according to claim 1, wherein $R_1$ is $NHR_2$ and $R_2$ is a hydrogen atom.

6. A method of preparing a modified pigment, comprising:
(a) providing a chemical having Structure Q2:

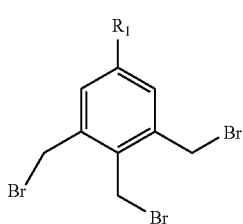

where $R_1$ is $NO_2$;
(b) substituting Br with

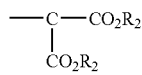

where $R_2$ is an alkyl selected from methyl, ethyl, benzyl, an alkyl with 1 to 30 carbon atoms, and combinations thereof;
(c) converting $R_1$ to $NH_2$;
(d) coupling the structure resulting from step (c) to a pigment through diazonium chemistry to yield Structure K

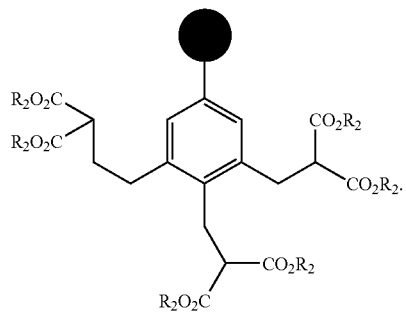

7. The method according to claim 6, further comprising a step wherein each $R_2$ in Structure K is substituted with a hydrogen atom.

8. A method of preparing a modified pigment, comprising:
(a) providing a chemical having structure E

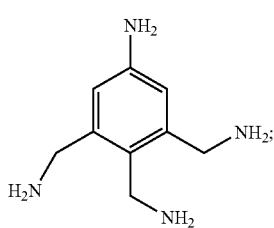

(b) producing a composition from structure E by substituting one hydrogen atom in each —$NH_2$ group with a

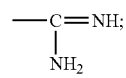

(c) producing a chemical having Structure H by coupling the structure resulting from step (b) to a pigment using diazonium chemistry

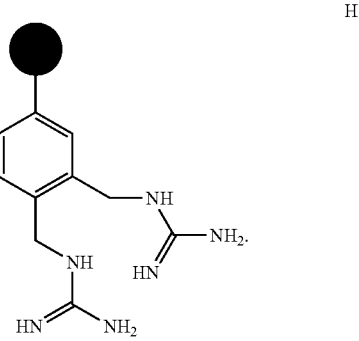

9. A method of preparing a modified pigment, comprising:
(a) providing a chemical having structure F;

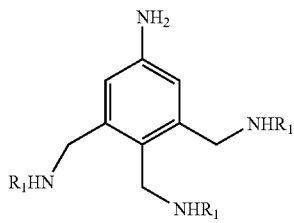

where R1 is a hydrogen atom;
(b) producing a composition from structure F by coupling structure F to a pigment using diazonium chemistry;
(c) making a substitution in the structure resulting from step (b) so that $R_1$ is

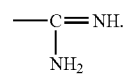

* * * * *

UNITED STATES PATENT AND TRADEMARK OFFICE
CERTIFICATE OF CORRECTION

PATENT NO. : 7,579,080 B2 Page 1 of 1
APPLICATION NO. : 11/350970
DATED : August 25, 2009
INVENTOR(S) : Sundar Vasudevan It is certified that error appears in the above-identified patent and that said Letters Patent is hereby corrected as shown below:

On the Title page, in field (73), Assignee, in column 1, line 2,
delete "Compan," and insert -- Company, --, therefor.

In column 10, line 44, in Claim 9, delete "R1" and insert -- $R_1$ --, therefor.

Signed and Sealed this

Twenty-second Day of June, 2010

David J. Kappos
*Director of the United States Patent and Trademark Office*